United States Patent
Xu et al.

(10) Patent No.: US 11,399,396 B2
(45) Date of Patent: Jul. 26, 2022

(54) RANDOM ACCESS METHOD AND DEVICE

(71) Applicant: GUANGDONG OPPO MOBILE TELECOMMUNICATIONS CORP., LTD., Guangdong (CN)

(72) Inventors: Weijie Xu, Guangdong (CN); Chuanfeng He, Guangdong (CN); Jing Xu, Guangdong (CN); Cong Shi, Guangdong (CN); Zuomin Wu, Guangdong (CN)

(73) Assignee: GUANGDONG OPPO MOBILE TELECOMMUNICATIONS CORP, LTD., Guangdong (CN)

( * ) Notice: Subject to any disclaimer, the term of this patent is extended or adjusted under 35 U.S.C. 154(b) by 0 days.

(21) Appl. No.: 17/327,263

(22) Filed: May 21, 2021

(65) Prior Publication Data

US 2021/0289563 A1    Sep. 16, 2021

Related U.S. Application Data

(63) Continuation of application No. PCT/CN2019/120034, filed on Nov. 21, 2019.

(30) Foreign Application Priority Data

Nov. 30, 2018  (WO) ................ PCT/CN2018/118653

(51) Int. Cl.
*H04W 74/08*  (2009.01)
*H04W 74/00*  (2009.01)

(52) U.S. Cl.
CPC ..... *H04W 74/0841* (2013.01); *H04W 74/008* (2013.01)

(58) Field of Classification Search
CPC .......... H04W 74/0841; H04W 74/006; H04W 74/008; H04W 74/0858; H04W 4/70;
(Continued)

(56) References Cited

U.S. PATENT DOCUMENTS

| 2016/0219626 A1* | 7/2016 | Martin ................ H04W 74/085 |
| 2017/0126480 A1* | 5/2017 | Youtz ................ H04W 74/0833 |

FOREIGN PATENT DOCUMENTS

| CN | 104852787 A | 8/2015 |
| CN | 105557056 A | 5/2016 |

(Continued)

OTHER PUBLICATIONS

3GPP TSG-RAN WG2 Meeting #NR Ad Hoc—R2-1700024—Spokane, USA, Jan. 17-19, 2017—ASUSTeK, Consideration on fallback of 2-step RACH procedure (4 pages).

(Continued)

*Primary Examiner* — Anez C Ebrahim
(74) *Attorney, Agent, or Firm* — Perkins Coie LLP (57) ABSTRACT

Disclosed in the present disclosure is a random access method. The method comprises: during a two-step random access procedure, a terminal device sending a first message for the two-step random access procedure; and if the number of times the first message for the two-step random access procedure is sent reaches a first threshold and a second message for the two-step random access procedure has not been received, the terminal device switches to a four-step random access procedure.

20 Claims, 4 Drawing Sheets

(58) Field of Classification Search
CPC ........... H04W 74/085; H04W 28/0221; H04W 28/0205
See application file for complete search history.

(56) References Cited

FOREIGN PATENT DOCUMENTS

| | | | |
|---|---|---|---|
| CN | 106470468 A | 3/2017 | |
| CN | 107689839 A | 2/2018 | |
| CN | 108282897 A | 7/2018 | |
| CN | 108282899 A | 7/2018 | |
| CN | 110392442 A | 10/2019 | |
| RU | 2664484 C2 | 8/2018 | |
| WO | 2018085726 A1 | 5/2018 | |
| WO | 2018127042 A1 | 7/2018 | |
| WO | 2018175809 A1 | 9/2018 | |
| WO | 2019064768 A1 | 4/2019 | |

OTHER PUBLICATIONS

International Search Report dated Feb. 19, 2020 of PCT/CN2019/120034 (4 pages).
International Search Report dated Aug. 27, 2019 of PCT /CN2018/118653 (4 pages).
Extended European Search Report for European Application No. 19888293.8 dated Dec. 3, 2021. 8 pages.
First Office Action for Russian Application No. 2021116963 dated Oct. 12, 2021. 9 pages with English translation.
Qualcomm Incorporated "Summary of Remaining Details on RACH Procedure" R1-1803524; 3GPP TSF-RAN WG1 92; Athens, Greece; Feb. 26-Mar. 2, 2018. 44 pages.
Samsung "Initial Access and Mobility Procedure for NR-U" R1-1812978; 3GPP TSF RAN WG1 Meeting #95; Spokane, USA; Nov. 12-16, 2018. 9 pages.
Charter Communications "Four-step and two-step RA" R1-1811323; 3GPP TSG RAN WG1 Meeting #94bis; Chengdu, P.R. China; Oct. 8-12, 2018. 2 pages.
Examination Report for Indian Application No. 202117028230 dated Mar. 4, 2022. 6 pages with English translation.
Examination Report No. 1 for Australian Application No. 2019386691 dated Feb. 24, 2022. 3 pages.
First Office Action for Chinese Application No. 202110912430.0 dated Mar. 25, 2022. 20 pages with English translation.
ZTE Corporation et al. "On 2-step RACH procedure in NR" R1-1611274; 3GPP TSG RAN WG1 Meeting #87; Reno, USA; Nov. 14-18, 2016. 4 pages.
First Office Action of the Japanese application No. 2021-529347, dated May 20, 2022. 12 pages with English Translation.
Sony "Considerations on initial access procedures for NR unlicensed" R2-181817075; 3GPP TSG-RAN WG2 Meeting #103; Spokane, USA, Nov. 12-16, 2018. 5 pages.

* cited by examiner

RANDOM ACCESS METHOD AND DEVICE

CROSS-REFERENCE TO RELATED APPLICATIONS

This application is a continuation application of International PCT Application No. PCT/CN2019/120034 filed on Nov. 21, 2019, which claims priority of PCT Patent Application No. PCT/CN2018/118653, filed with the Chinese Patent Office on Nov. 30, 2018 and entitled "Random Access Method and Device", the entire contents of both applications are incorporated herein by reference in its entirety.

TECHNICAL FIELD

Implementations of the present disclosure relate to a communication field, and more specifically, to a random access method and device.

BACKGROUND

In a Random Access (RA) procedure of a 5G system or a New Radio (NR) system, a mode of 2-step RA is allowed. In a 2-step RA procedure, Messages (referred to as Msg for short) 1 and Msg 3 in a 4-step RA procedure may be sent as a first message, and Msg 2 and Msg 4 in the 4-step random access procedure may be sent as a second message. Therefore, a terminal device needs to realize an effective switching between the 2-step random access procedure and the 4-step random access procedure.

SUMMARY

Implementations of the present disclosure provide a random access method and device.

In a first aspect, a random access method is provided, which includes: sending, by a terminal device, a first message of the 2-step random access procedure in the 2-step random access procedure; and switching, by the terminal device, to a 4-step random access procedure if a second message of the 2-step random access procedure is still not received when sending times of the first message of the 2-step random access procedure reach a first threshold.

In a second aspect, a random access method is provided, which includes: sending, by a network device, indication information, wherein the indication information is used for indicating a first threshold, and the first threshold is used for a terminal device to determine whether to switch from a 2-step random access procedure to a 4-step random access procedure.

In a third aspect, a terminal device is provided. The terminal device may perform the method in the above first aspect or any optional implementation mode of the first aspect. Specifically, the terminal device may include function modules for performing the method in the above first aspect or any possible implementation mode of the first aspect.

In a fourth aspect, a network device is provided, which may perform the method in the above second aspect or any optional implementation mode of the second aspect. Specifically, the network device includes functional modules configured to perform the method in the above second aspect or any one of the possible implementation mode of the second aspect.

In a fifth aspect, a terminal device is provided, which includes a processor and a memory. The memory is configured to store a computer program, and the processor is configured to call and run the computer program stored in the memory to perform the method in the above first aspect or any possible implementation mode of the first aspect.

In a sixth aspect, a network device is provided, which includes a processor and a memory. The memory is configured to store a computer program, and the processor is configured to call and run the computer program stored in the memory to perform the method in the above second aspect or any possible implementation mode of the second aspect.

In a seventh aspect, a chip is provided, which is configured to implement the method in the above first aspect or any possible implementation mode of the first aspect. Specifically, the chip includes a processor, configured to call and run a computer program from a memory, enabling a device in which the chip is installed to perform the method in the above first aspect or any possible implementation mode of the first aspect.

In an eighth aspect, a chip is provided, which is configured to implement the method in the above second aspect or any possible implementation mode of the second aspect. Specifically, the chip includes a processor, configured to call and run a computer program from a memory, enabling a device in which the chip is installed to perform the method in the above second aspect or any possible implementation mode of the second aspect.

In a ninth aspect, a computer readable storage medium is provided, which is configured to store a computer program, wherein the computer program enables a computer to perform the method in the above first aspect or any possible implementation mode of the first aspect.

In a tenth aspect, a computer readable storage medium is provided, configured to store a computer program, wherein the computer program enables a computer to perform the method in the above second aspect or any possible implementation mode of the second aspect.

In an eleventh aspect, a computer program product is provided, including computer program instructions, wherein the computer program instructions enable a computer to perform the method in the above first aspect or any possible implementation mode of the first aspect.

In a twelfth aspect, a computer program product is provided, including computer program instructions, wherein the computer program instructions enable a computer to perform the method in the above second aspect or any possible implementation mode of the second aspect.

In a thirteenth aspect, a computer program is provided, which, when being run on a computer, enables the computer to perform the method in the above first aspect or any possible implementation mode of the first aspect.

In a fourteenth aspect, a computer program is provided, which, when being run on a computer, enables the computer to perform the method in the above second aspect or any possible implementation mode of the second aspect.

In a fifteenth aspect, a communication system is provided, which includes a terminal device and a network device.

The terminal device is configured to send a first message of a 2-step random access procedure in the 2-step random access procedure; and switch to a 4-step random access procedure if a second message of the 2-step random access procedure is still not received when sending times of e first message of the 2-step random access procedure reach a first threshold.

The network device is configured to send indication information, wherein the indication information is used for indicating a first threshold, and the first threshold is used for the terminal device to determine whether to switch from the 2-step random access procedure to the 4-step random access procedure.

DETAILED DESCRIPTION

Technical solutions in implementations of the present disclosure will be described below with reference to the drawings in the implementations of the present disclosure. It is apparent that the implementations described are some of the implementations of the present disclosure, rather than all of the implementations of the present disclosure. All other implementations achieved by a person of ordinary skill in the art based on the implementations of the present disclosure without using an inventive effort are within the protection scope of the present disclosure.

The technical solution of the implementation of the present disclosure may be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next generation communication system or another communication system, etc.

Generally speaking, a conventional communication system supports a limited number of connections and is easy to implement. However, with a development of communication technology, a mobile communication system will not only support conventional communication, but also support, for example, Device to Device (D2D) communication, Machine to Machine (M2M) communication, Machine Type Communication (MTC), and Vehicle to Vehicle (V2V) communication. The implementations of the present disclosure may also be applied to these communication systems.

Optionally, a communication system in an implementation of the present disclosure may be applied to scenarios such as Carrier Aggregation (CA), Dual Connectivity (DC), and Standalone (SA) network deployment.

Figure 1:
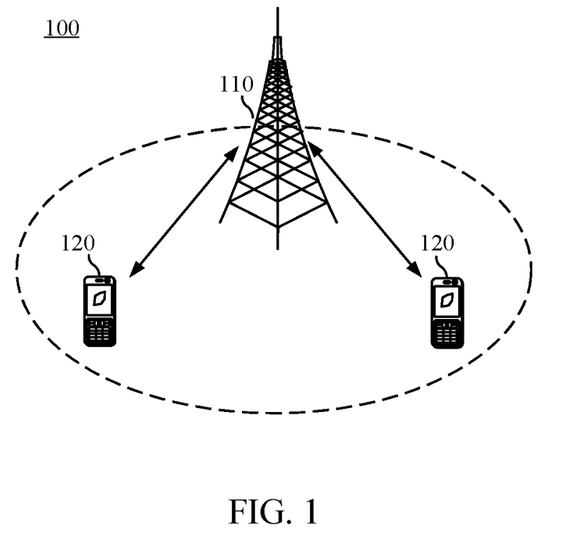
FIG. 1 is a schematic diagram of a possible wireless communication system applied by an implementation of the present disclosure.

Illustratively, a communication system 100 applied in an implementation of the present disclosure is shown in FIG. 1. The wireless communication system 100 may include a network device 110. The network device 110 may be a device that communicates with a terminal device. The network device 110 may provide communication coverage for a specific geographical area, and may communicate with terminal devices located within the coverage area. Optionally, the network device 100 may be a Base Transceiver Station (BTS) in a GSM system or a CDMA system, or may be a NodeB (NB) in a WCDMA system, or may be an Evolutional Node B (eNB or eNodeB) in an LTE system, or a network side device in an NR system, or a radio controller in a Cloud Radio Access Network (CRAN). Or the network device may be a relay station, an access point, a vehicle-mounted device, a wearable device, a network side device in a next generation network, or a network device in a future evolved Public Land Mobile Network (PLMN), etc.

The wireless communication system 100 further includes at least one terminal device 120 in a coverage range of the network device 110. The terminal device 120 may be mobile or fixed. Optionally, the terminal device 120 may be referred to as an access terminal, a User Equipment (UE), a subscriber unit, a subscriber station, a mobile station, a mobility station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like. Herein, optionally, a Device to Device (D2D) communication may also be performed between the terminal devices 120.

The network device 110 may provide a service for a cell, and the terminal device 120 communicates with the network device 110 through a transmission resource (e.g., a frequency domain resource or a spectrum resource) used by the cell, which may be a cell corresponding to the network device 110 (e.g., a base station). The cell may belong to a macro base station, or a base station corresponding to a Small cell. For example, the small cell here may include: a Metro cell, a Micro cell, a Pico cell, a Femto cell, etc. These small cells have features of small coverage range and a low sending power, and are suitable for providing high-speed data transmission services.

FIG. 1 shows one network device and two terminal devices as an example. Optionally, the wireless communication system 100 may include multiple network devices, and another quantity of terminal devices may be included within the coverage range of each network device, which is not limited in implementations of the present disclosure. In addition, the wireless communication system 100 may also include another network entity such as a network controller, a mobile management entity, and the implementations of the present disclosure are not limited thereto.

After a cell search process, the terminal device has achieved downlink synchronization with the cell, so the terminal device can receive downlink data. However, the terminal device can perform uplink transmission only if the terminal device achieves uplink synchronization with the cell. The terminal device may establish a connection with a cell through a Random access procedure (RAR) and obtain uplink synchronization. That is to say, through the random access, the terminal device may obtain uplink synchronization, and obtain a unique identifier assigned to it by the network device, that is, a Cell Radio Network Temporary Identity (C-RNTI). Therefore, the random access may be applied not only in an initial access, but also in the case where the user uplink synchronization is lost. For the convenience of understanding, a random access procedure will be briefly introduced with reference to FIG. 2 and FIG. 3.

The random access procedure may usually be triggered by one of the following six types of triggering events:

(1) Initial Access

A terminal device will enter Radio Resource Control (RRC)_CONNECTED state from RRC_IDLE state.

(2) Handover

When the terminal device needs to establish uplink synchronization with a new cell, the terminal device needs to initiate the random access in the new cell.

(3) RRC Connection Re-establishment

The terminal device reestablishes a wireless connection after a Radio Link Failure (RLF) occurs.

(4) In RRC_CONNECTED state, when downlink data arrives, the uplink is in an "unsynchronized" state.

At this time, the terminal device needs to reply an Acknowledgement (ACK) or a Negative Acknowledgement (NACK) after the downlink data arrives.

(5) In RRC_CONNECTED state, when uplink data arrives, the uplink is in an "unsynchronized" state or there is no Physical Uplink Control Channel (PUCCH) resource available for Scheduling Request (SR) transmission.

When the uplink data arrives and, for example, it is needed to report a measurement report or send data, if the uplink is in the "unsynchronized" state, the terminal device may initiate the random access procedure. Or, if the terminal device that is already in the uplink synchronization state is allowed to use a Random Access Channel (RACH) instead of SR, the terminal device may initiate the random access procedure when the uplink is in the "unsynchronized" state.

(6) In RRC_CONNECTED state, in order to locate, Timing Advance (TA) needs to be acquired.

In addition, the random access may also be triggered due to reasons such as RRC_INACTIVE transition, request for Other System Information (OSI), or beam failure recovery.

Figure 2:
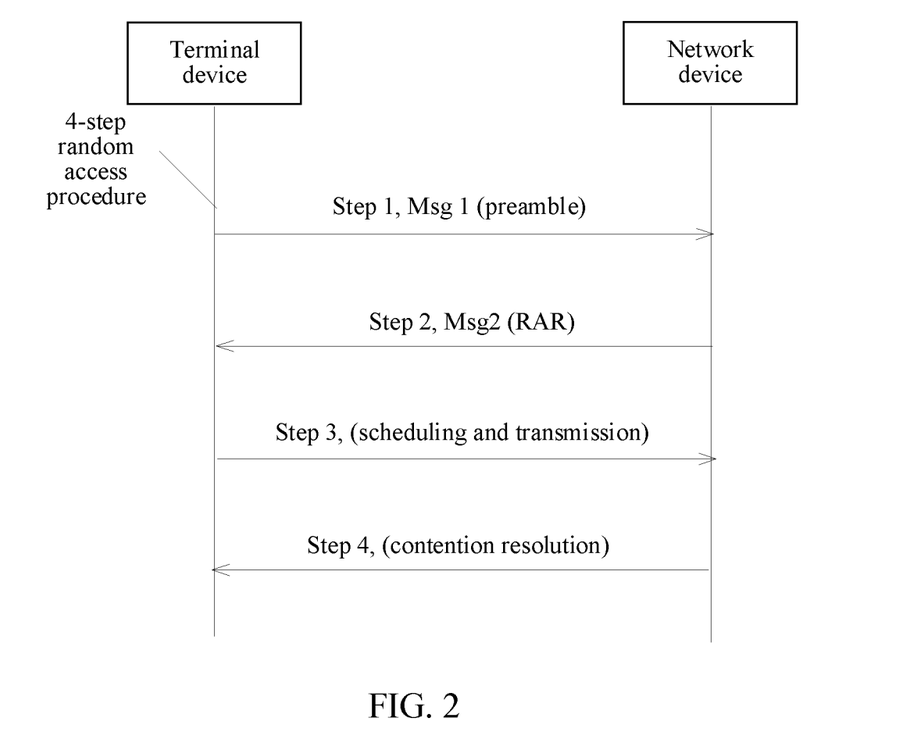
FIG. 2 is a schematic flow interaction diagram of a 4-step random access.

FIG. 2 is a flow interaction diagram of a 4-step Random Access. As shown in FIG. 2, the 4-step random access procedure may include the following four steps:

Step 1, a terminal device sends Msg 1.

The terminal device sends Msg 1 to a network device to tell the network device that the terminal device has initiated a random access request, wherein the Msg 1 carries a Random Access Preamble (RAP), which may also be called random access preamble, preamble, lead code, etc. At the same time, Msg 1 may also be used for the network device to estimate a transmission delay between the network device and the terminal device and calibrate the uplink time based on the transmission delay.

Step 2, the network device sends Msg 2.

After receiving Msg 1 sent by the terminal device, the network device sends Msg 2, that is, a Random Access Response (RAR) message, to the terminal device. The Msg 2 may be scrambled by a Random Access Radio Network Temporary Identity (RA-RNTI). The terminal device may listen to a PDCCH within an RAR window to receive the RAR message scrambled by the RA-RNTI (regardless of possible measurement gap).

If the terminal device does not receive the RAR message replied by the network device within the RAR window, it is considered that the random access of this time has failed. If the terminal device successfully receives a RAR message within the RAR window and an index of a preamble carried in the RAR message is same as an index of the preamble in Msg 1 sent by the terminal device, the terminal device may stop listening to the RAR message. The RA-RNTI is used by the terminal device to descramble the RAR message.

The RAR message may include corresponding messages for multiple terminal devices which send the preambles. The response message for each terminal device includes the index of the preamble (RAPID) adopted by the terminal device, resource allocation information of Msg 3, Time Advance (TA) adjustment information, and Temporary Cell-Radio Network Temporary Identity (TC-RNTI), etc.

In an NR standard, a RAR message may be scheduled using Download Control Information (DCI) format 1-0, and a PDCCH for scheduling the RAR message may be scrambled by the RA-RNTI described above.

Step 3, the terminal device sends Msg 3.

After receiving the RAR message, the terminal device determines whether the RAR message is the terminal device's own RAR message. For example, the terminal device may use a preamble identifier for checking. After determining that the RAR message is the terminal device's own RAR message, the terminal device generates Msg 3 in an RRC layer and sends Msg 3 to the network device. Identification information of the terminal device needs to be carried in Msg3.

For different random access triggering events, Msg 3 sent by the terminal device in Step 3 of the 4-step random access procedure may include different contents.

For example, for a scenario of an initial access, Msg 3 includes an RRC Connection Request message (RRC Connection Request) generated by the RRC layer, wherein the RRC Connection Request at least carries Non-Access Stratum (NAS) identification information of the terminal device. In addition, Msg 3 may also carry, for example, a Serving-Temporary Mobile Subscriber Identity (S-TMSI) of the terminal device or a random number.

For another example, for a scenario of an RRC connection re-establishment, Msg 3 includes an RRC connection re-establishment request message (RRC Connection Re-establishment Request) generated by the RRC layer and does not carry any NAS message. In addition, Msg 3 may also carry, for example, a Cell Radio Network Temporary Identifier (C-RNTI) and Protocol Control Information (PCI).

For another example, for a scenario of a handover, Msg 3 includes an RRC Handover Confirm message (RRC Handover Confirm) generated by the RRC layer, wherein RRC Handover Confirm carries the C-RNTI of the terminal device. In addition, Msg 3 may also carry information such as Buffer Status Report (BSR), etc. For other triggering events such as scenarios of arrival of uplink/downlink data, Msg 3 should at least include C-RNTI of the terminal device.

It should be noted that uplink transmission usually uses terminal device specific information. For example, C-RNTI or the like is used for scrambling data carried in an Uplink Shared Channel (UL-SCH). At this time, however, the conflict has not been resolved, so only TC-RNTI can be used instead of C-RNTI when scrambling Msg 3.

Step 4, the network device sends Msg 4.

The network device sends Msg 4 to the terminal device. The terminal device correctly receives Msg 4 and completes a Contention Resolution. For example, in an establishment process of an RRC connection, an RRC connection establishment message may be carried in Msg 4.

Since the terminal device in step 3 will carry the terminal device's own unique identifier in Msg 3, such as C-RNTI or identification information (such as S-TMSI or a random number) from a core network, the network device will carry the unique identifier of the terminal device in Msg 4 in the Contention Resolution mechanism to designate a terminal device that wins the Contention. Other terminal devices that did not win in the Contention Resolution will re-initiate a random access. TC-RNTI may be used for scrambling a PDCCH of Msg 4.

In a 5G system, when the terminal device performs the random access, besides the above 4-step random access mode, a 2-step random access mode may also be used for performing the random access. One possible method is to send Msg 1 and Msg 3 in the 4-step random access procedure as a first message in a 2-step random access procedure, and send Msg 2 and Msg 4 in the 4-step random access procedure as a second message in the 2-step random access procedure.

Figure 3:
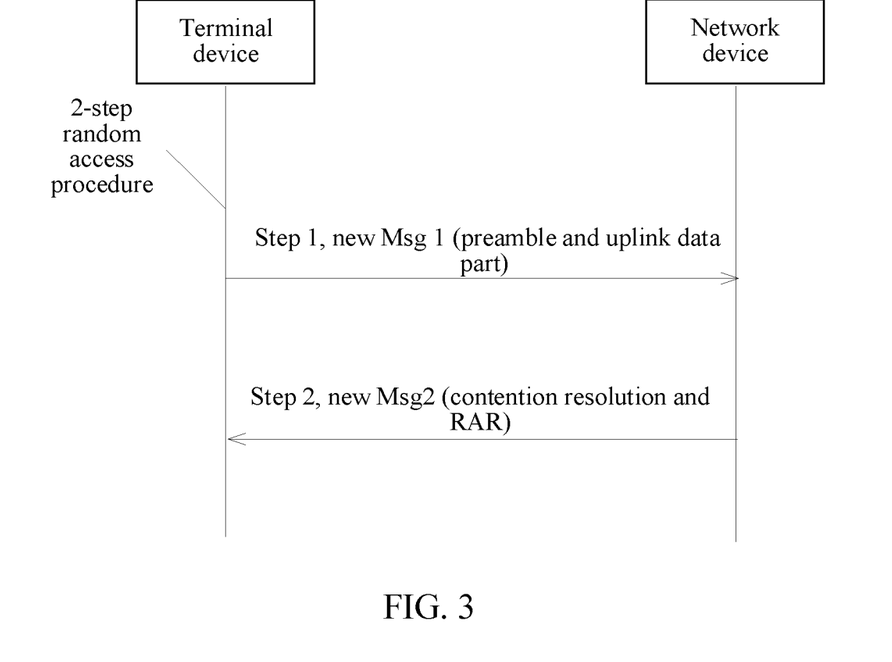
FIG. 3 is a schematic flow interaction diagram of a 2-step random access.

As shown in FIG. 3, a 2-step random access procedure may include the following two steps:

Step 1, the terminal device sends a first message.

The first message (temporarily called "new Msg 1 (New_Msg 1)") may include a preamble and uplink data. The uplink data may be carried on an uplink channel, wherein the uplink channel may be, for example, a Physical Uplink Shared Channel (PUSCH). The uplink channel may carry, for example, identification information of the terminal device and a reason of an RRC request. The first message is similar to part or all of information carried in Msg 1 and Msg 3 in the 4-step random access procedure.

Step 2, the network device sends a second message.

If the network device successfully receives the first message sent by the terminal device, the network device sends the second message to the terminal device. The second message (temporarily called "new Msg 2 (New_Msg 2)") may include, for example, Contention Resolution information, C-RNTI allocation information, TA adjustment information, etc. This second message is similar to part or all of information carried in Msg 2 and Msg 4 in the 4-step random access procedure.

In the 2-step random access procedure, the second message carries Contention Resolution information (including information related to the identifier of the terminal device sent by the terminal device in the first message) for a single terminal device, C-RNTI allocation information, TA adjustment information, etc. In addition, the second message may also carry RRC resume message, etc.

It should be understood that FIG. 2 or FIG. 3 is only an example. Since the 2-step random access procedure has not yet entered a standardization stage, FIG. 3 is only taken as an example for introducing the 2-step random access procedure. There are other possibilities for definitions of each random access message involved therein, and other definitions of each random access message in the 2-step random access procedure are not limited. The method described in the implementation of the present disclosure is applicable to all other 2-step random access procedure.

The new Msg 1 sent in the 2-step random access procedure usually includes the preamble and uplink data part such as the contents carried by Msg 3 in the 4-step random access procedure, so as to shorten time delay of the random access. In some cases, for example, channel quality is poor or mutual interference is caused by random access also being initiated by other terminal device, the network device may not detect the new Msg 1 sent by the terminal device. At this time, it is inefficient for both the terminal device and the network device to resend the new Msg 1 blindly. For the terminal device, each time a new Msg 1 is sent, it means that the preamble and the data part are sent at the same time. Compared with Msg 1 in the 4-step random access procedure, the power consumed by the terminal device for sending the first message in the 2-step random access procedure is far greater than the power used for sending the preamble only. On the other hand, for the network device, sending preamble and data part at the same time means an increase of air interface interference, which will cause interference to sending of new Msg 1 by other terminal device.

An implementation of the present disclosure provides a random access method, which can realize an effective switching between the 2-step random access procedure and the 4-step random access procedure.

In an implementation of the present disclosure, the first message and the second message in the 2-step random access procedure are also called "new Msg 1 (New_Msg 1)" and "new Msg 2 (New_Msg 2)" respectively, and the first to fourth messages in the 4-step random access procedure are also called "Msg 1, Msg 2, Msg 3 and Msg 4", respectively. The new Msg 1 may include part or all of the information carried in Msg 1 and Msg 3. The new Msg 2 may include part or all of the information carried in Msg 2 and Msg 4.

Figure 4:
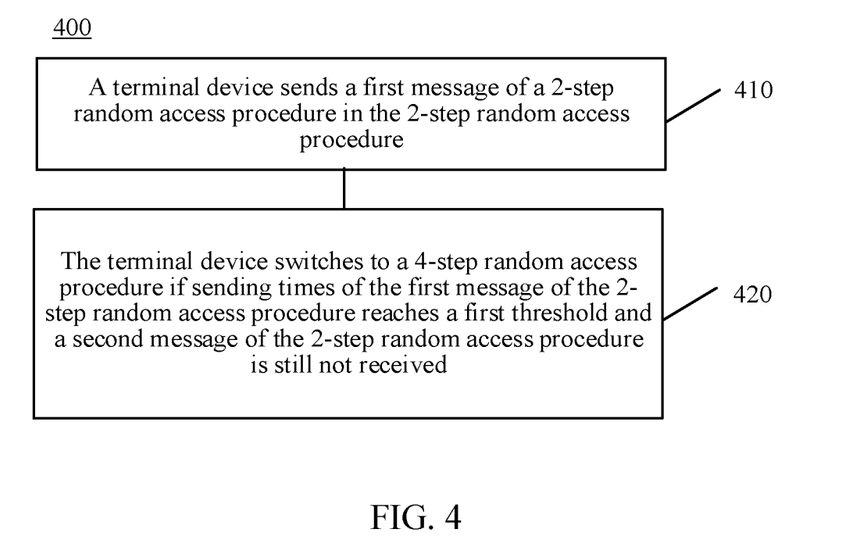
FIG. 4 is a schematic flowchart of a random access method according to an implementation of the present disclosure.

FIG. 4 is a schematic flowchart of a random access method 400 according to an implementation of the present disclosure. The method described in FIG. 4 may be performed by a communication device, wherein the communication device is, for example, a terminal device or a network device. The terminal device is, for example, the terminal device 120 shown in FIG. 1. The network device is, for example, the network device 110 shown in FIG. 1. As shown in FIG. 4, the random access method 400 may include part or all of following acts, in which:

In 410, a terminal device sends a first message (denoted by Msg A) of a 2-step random access procedure.

In 420, if sending times of the first message of the 2-step random access procedure reaches a first threshold and a second message (denoted by Msg B) of the 2-step random access procedure is still not received, the terminal device switches to a 4-step random access procedure.

The first message of the 2-step random access procedure may include, for example, a preamble and/or a data channel. The first message of the 2-step random access procedure is equivalent to part or all information in Msg 1 and Msg 3 of the 4-step random access procedure.

The second message of the 2-step random access procedure includes, for example, a random access response (RAR) message and/or a contention resolution message. The second message of the 2-step random access procedure is equivalent to part or all information in Msg 2 and Msg 4 in the 4-step random access procedure.

The terminal device needs to try to send the first message of the 2-step random access procedure several times to access the network device as soon as possible. However, due to reasons such as poor channel quality or interference when other terminal device initiates access, the network device may never detect the first message. Compared with Msg 1 of the 4-step random access procedure, the first message of the 2-step random access procedure carries more information, so the terminal device keeps sending the first message of the 2-step random access procedure, which not only increases its own power consumption, but also may bring interference to the access procedure of other terminal device.

In an implementation of the present disclosure, when the sending times of the first message of the 2-step random access procedure exceed the first threshold and the second message fed back by the network is still not received, the terminal device switches to the 4-step random access procedure, thus avoiding the terminal device from continuously initiating 2-step random accesses when the channel quality is poor or the interference is serious, such that unnecessary power consumption of the terminal device is saved and influence on other users in the system is reduced.

Optionally, the network device may send indication information to the terminal device, wherein the indication information is used for indicating the first threshold. Accordingly, the terminal device receives the indication information sent by the network device and determines the first threshold according to the indication information. The indication information is carried in, for example, a Radio Resource Control (RRC) signaling or a broadcast message.

Or, optionally, the terminal device acquires the first threshold pre-stored in the terminal device. For example, the first threshold is agreed by a protocol.

The first threshold is a positive integer. For example, the terminal device may record times it sends the first message in the 2-step random access procedure using a counter. When a value recorded by the counter reaches the first threshold, the terminal device switches to the 4-step random access procedure and returns the counter to zero.

Optionally, after the terminal device switches to the 4-step random access procedure, the method further includes: the terminal device determining a first power; and the terminal device using the first power to send a first message (Msg 1) in the 4-step random access message.

Further, optionally, the terminal device determining the first power includes: the terminal device determining the first power according to a sending power of the first message of the 2-step random access procedure.

For example, the terminal device may take an average value of powers used for sending the first message N times in the 2-step random access procedure as the first power, wherein N may be less than or equal to the first threshold.

For another example, the terminal device may determine the first power according to the sending power of a last transmission of the first message in the 2-step random access procedure.

That is to say, after the terminal device switches to the 4-step random access procedure, the sending power used for sending Msg 1 for the first time in the 4-step random access procedure may be determined according to the sending power of the last transmission of the first message in the 2-step random access procedure.

For example, the terminal device may take the sending power of the last transmission of the first message in the 2-step random access procedure as the first power.

For another example, the terminal device may increase or add $\Delta P$ to the sending power of the last transmission of the first message in the 2-step random access procedure to obtain the first power.

A value of $\Delta P$ is not limited in the implementation of the present disclosure. $\Delta P$ may be determined by the network device and notified to the terminal device, or it may be agreed by a protocol. The value of $\Delta P$ may be determined in the following modes.

Mode 1

The terminal device may determine $\Delta P$ according to power control parameters in the 2-step random access procedure and/or the 4-step random access procedure.

The power control parameters in the 2-step random access procedure include, for example, a power control parameter related to a preamble format of a Physical Random Access Channel (PRACH) in the first message (Msg A) in the 2-step random access procedure, which is hereinafter referred to as DELTA_PREAMBLE_2stepRACH; and/or target expected received power of the preamble in the first message (Msg A) in the 2-step random access procedure, which is hereinafter referred to as preambleReceivedTargetPower_2stepRACH.

The power control parameters in the 4-step random access procedure include, for example, a power control parameter related to a preamble format of a PRACH in the first message (Msg 1) in the 4-step random access procedure, which is hereinafter referred to as DELTA_PREAMBLE_4stepRACH; and/or target expected received power of the preamble in the first message (Msg 1) in the 4-step random access procedure, which is hereinafter referred to as preambleReceivedTargetPower_4stepRACH.

DELTA_PREAMBLE_2stepRACH and DELTA_PREAMBLE_4stepRACH may be obtained by looking up a table. The network device configures the preamble format for obtaining the 2-step random access procedure and the 4-step random access procedure. The terminal device may query values of DELTA_PREAMBLE corresponding to the preamble format used by the terminal device according to tables, such as Table 1 and Table 2 below. Table 1 shows a corresponding relation between long preamble formats and DELTA_PREAMBLE, and Table 2 shows a corresponding relation between short preamble formats and DELTA_PREAMBLE.

TABLE 1

| Preamble format | Values of DELTA_PREAMBLE (dB) |
| --- | --- |
| 0. | 0 dB |
| 1. | −3 dB |
| 2. | −6 dB |
| 3. | 0 dB |

TABLE II

| Preamble format | Values of DELTA_PREAMBLE (dB) |
| --- | --- |
| A1. | $8 + 3 \times \mu$ |
| A2. | $5 + 3 \times \mu$ |
| A3. | $3 + 3 \times \mu$ |
| B1. | $8 + 3 \times \mu$ |
| B2. | $5 + 3 \times \mu$ |
| B3. | $3 + 3 \times \mu$ |
| B4. | $3 \times \mu$ |
| C0. | $11 + 3 \times \mu$ |
| C2. | $5 + 3 \times \mu$ |

Among them, $\mu$ is a subcarrier spacing of the preamble of Msg 1 in the 4-step random access procedure or a subcarrier spacing of the preamble of PRACH channel in Msg A in the 2-step random access procedure.

The network device may configure the preamble format and the subcarrier spacing of the preamble in the 2-step random access procedure and the 4-step random access procedure for the terminal device through higher layer signaling, such as a broadcasting signaling or an RRC dedicated signaling.

The network device may notify the terminal device of the target expected received power through higher layer signaling, such as a broadcasting signaling or an RRC dedicated signaling. The network device may notify the terminal device of a value of preambleReceivedTargetPower_ 2stepRACH and a value of preambleReceivedtTargetPower_ 4stepRACH respectively. Or, the network device may only notify the terminal device of the value of preamble ReceivedTargetPower_4stepRACH, while the value of preambleReceivedTargetPower_2stepRACH is the same as the value of preambleReceivedTargetPower_4stepRACH. Or, the network device may only notify the terminal device of the value of preambleReceivedTargetPower_ 2stepRACH, while the value of preambleReceivedTarget Power_4stepRACH is the same as the value of preambleReceivedTargetPower_2stepRACH.

After the terminal device obtains the power control parameters, $\Delta P$ may be determined based on the power control parameters. The terminal device may determine $\Delta P$ according to at least one power control parameter among the aforementioned DELTA_PREAMBLE_2stepRACH, DELTA_PREAMBLE_4stepRACH, preambleReceived Target power_2stepRACH and preambleReceivedTargetPower_ 4stepRACH.

For example, $\Delta$ P=DELTA_PREAMBLE_4stepRACH−DELTA_PREAMBLE_2stepRACH.

For another example, $\Delta$ P=DELTA_PREAMBLE_2stepRACH−DELTA_PREAMBLE_4stepRACH.

For another example, $\Delta$ P=preambleReceivedTargetPower_ 4stepRACH−preambleReceivedTargetPower_2stepRACH.

For another example, $\Delta$ P=preambleReceivedTargetPower_2stepRACH−preambleReceivedTargetPower_ 4stepRACH.

For another example, $\Delta$ P=preambleReceivedTargetPower_ 4stepRACH−preambleReceivedTargetPower_2stepRACH+DELTA_PREAMBLE_4stepRACH−DELTA_ PREAMBLE_2stepRACH.

In another example, $\Delta P$=preambleReceivedTargetPower_2stepRACH−preambleReceivedTargetPower_4stepRACH+DELTA_PREAMBLE_2stepRACH−DELTA_PREAMBLE_ 4stepRACH.

Mode 2

$\Delta P=\Delta P1$. $\Delta P1$ is an increased sending power compared with power of the last transmission of the first message when the first message is sent each time in the 4-step random access procedure.

For this $\Delta P1$, in the 4-step random access procedure, the sending power used by the terminal device for sending Msg 1 each time needs to be increased based on the sending power used to send Msg 1 last time, so as to improve the success rate of sending Msg 1. That is, the power used for sending Msg 1 this time is greater by $\Delta P1$ than the power used for sending Msg 1 last time.

Mode 3

$\Delta P=\Delta P2$. $\Delta P2$ is the increased sending power compared with the power of the last transmission of the first message when the first message is sent each time in the 2-step random access procedure.

For this $\Delta P2$, in the 2-step random access procedure, the sending power used by the terminal device for sending the first message each time needs to be increased by $\Delta P2$ based on the sending power of the last transmission of the first message, so as to improve the success rate of sending the first message. That is, the sending power of the first message sent by the terminal device for the $(i+1)^{th}$ time is greater by $\Delta P2$ than the sending power of the first message for the $i^{th}$ time, wherein $1 \leq i \leq N$, and N is equal to the first threshold.

The above three modes may be used alone for determining $\Delta P$, or at least two of the above three modes may be used in combination for determining $\Delta P$, which is not limited in the present disclosure.

For example, based on mode 1 and mode 2, $\Delta P$ preambleReceivedTargetPower_4stepRACH−preambleReceivedTargetPower_2stepRACH+DELTA_PREAMBLE_4stepRACH−DELTA_PREAMBLE_2stepRACH+$\Delta P1$ may be obtained.

For another example, based on mode 1 and mode 3, $\Delta P$=preambleReceivedTargetPower_4stepRACH−preambleReceivedTargetPower_2stepRACH+DELTA_PREAMBLE_4stepRACH−DELTA_PREAMBLE_2stepRACH+$\Delta P2$ may be obtained.

For another example, based on mode 1, mode 2, and mode 3, $\Delta P$=preambleReceivedTargetPower_4stepRACH−preambleReceivedTargetPower_2stepRACH+DELTA_PREAMBLE_4stepRACH−DELTA_PREAMBLE_2stepRACH+$\Delta P1$+$\Delta P2$ may be obtained.

In addition, $\Delta P$ may be positive, negative or 0. When $\Delta P=0$, the terminal device may take the sending power of the last transmission of the first message in the 2-step random access procedure as the first power.

It should be understood that success or failure of sending the first message mentioned here may refer to whether the terminal device receives the second message in the 2-step random access procedure sent by the network device. After the terminal device sends the first message, if the terminal device receives the second message sent by the network device, it may be considered that the first message was sent successfully. After the terminal device sends the first message, if the second message sent by the network device is not received within a certain time, it may be considered that the sending of the first message has failed.

In addition, $\Delta P$ may also be other preset power values. Each time the terminal device switches from the 2-step random access procedure to the 4-step random access procedure, $\Delta P$ may be increased based on the sending power of the last transmission of the first message in the 2-step random access procedure, and the increased power is used for sending Msg 1 for the first time in the 4-step random access procedure.

Optionally, the sending power of the first message of the 2-step random access procedure includes a sending power of the preamble and/or a sending power of the data channel.

For example, when determining the first power, $\Delta P$ may be increased based on the sending power of the preamble, the sending power of the data channel, or total sending power of the preamble and the data channel.

The present disclosure further provides a random access method, which includes: by network device sending indication information to a terminal device, wherein the indication information is used for indicating a first threshold, and the first threshold is used for the terminal device to determine whether to switch from a 2-step random access procedure to a 4-step random access procedure.

When the sending times of the first message by the terminal device in the 2-step random access procedure reaches the first threshold, the terminal device switches from the 2-step random access procedure to the 4-step random access procedure.

Optionally, the indication information is carried in an RRC signaling or a broadcast message.

Optionally, the method further includes: the network device sending $\Delta P$ to the terminal device, wherein $\Delta P$ is used by the terminal device for determining a sending power for sending Msg 1 after switching to the 4-step random access procedure.

For example, the terminal device may increase the sending power of the last transmission of the first message in the 2-step random access procedure by $\Delta P$ to obtain a first power, and use the first power to send the first message in the 4-step random access procedure.

For example, $\Delta P$ may be equal to $\Delta P1$ or $\Delta P2$, or may be other power values. $\Delta P1$ is an increased sending power compared with a power of the last transmission of the first message each time the first message is sent in the 4-step random access procedure, and $\Delta P2$ is an increased sending power compared with a power of the last transmission of the first message each time the first message is sent in the 2-step random access procedure.

The method of the implementations of the present disclosure may be applied to various random access procedure, not only the initial access procedure. In addition, the method of the implementations of the present disclosure may be applied to a contention based random access procedure (contention based RACH) and a contention free random access procedure (contention free RACH).

It should be noted that, various implementations described in the present disclosure and/or the technical features in various implementations may be arbitrarily combined with each other if there is no conflict, and the technical solutions obtained after combinations should also fall into the protection scope of the present disclosure.

It should be understood that in various implementations of the present disclosure, sequence numbers of the various procedures do not imply an order of execution of the various procedures, the order of execution of the various procedures should be determined by their functions and internal logics, and should not constitute any limitation on implementation processes of implementations of the present disclosure.

A communication method according to an implementation of the present disclosure has been described in detail above. An apparatus according to implementations of the present disclosure will be described below with reference to FIGS. 5 to 8, and technical features described in the method implementations are applicable to following apparatus implementations.

Figure 5:
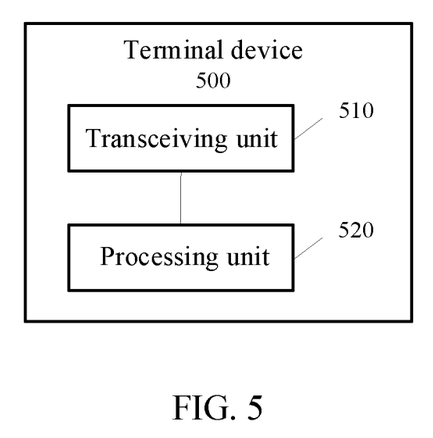
FIG. 5 is a schematic block diagram of a terminal device according to an implementation of the present disclosure.

FIG. 5 is a schematic block diagram of a terminal device 500 according to an implementation of the present disclosure. As shown in FIG. 5, the terminal device 500 includes a transceiving unit 510 and a processing unit 520, in which:

the transceiving unit 510 is configured to send a first message of a 2-step random access procedure in a 2-step random access procedure; and the processing unit 520 is configured to switch to a 4-step random access procedure when sending times of the first message of the 2-step random access procedure reaches a first threshold and a second message of the 2-step random access procedure is still not received.

Therefore, when the sending times of the first message of the 2-step random access procedure exceed the first threshold, but the second message fed back by the network is still not received, the terminal device switches to the 4-step random access procedure, thus avoiding the terminal device from continuously initiating 2-step random accesses even when channel quality is poor or interference is serious, thus unnecessary power consumption of the terminal device is saved and the influence on other users in the system is reduced.

Optionally, the first message of the 2-step random access procedure includes a preamble and/or a data channel.

Optionally, the second message of the 2-step random access procedure includes a random access response (RAR) message and/or a contention resolution message.

Optionally, the processing unit 520 is further configured to control the transceiving unit 510 to receive indication information, wherein the indication information is used for indicating the first threshold; or, the processing unit 520 is further configured to acquire the first threshold pre-stored in the terminal device.

Optionally, the indication information is carried in a RRC signaling or a broadcast message.

Optionally, after the terminal device switches to the 4-step random access procedure, the processing unit 520 is further configured to determine a first power by the terminal device. The transceiving unit 510 is further configured to use the first power to send a first message of the 4-step random access messages.

Optionally, the processing unit 520 is specifically configured to determine the first power according to a sending power of the first message of the 2-step random access procedure.

Optionally, the processing unit 520 is specifically configured to determine the first power according to a sending power of the last transmission of the first message in the 2-step random access procedure.

Optionally, the processing unit 520 is specifically configured to increase the sending power of the last transmission of the first message in the 2-step random access procedure by $\Delta P$ to obtain the first power.

Optionally, the $\Delta P=\Delta P1$, wherein $\Delta P1$ is an increased sending power compared with a power of the last transmission of the first message each time the first message is sent in the 4-step random access procedure.

Optionally, the $\Delta P=\Delta P2$, wherein $\Delta P2$ is an increased sending power compared with a power of the last transmission of the first message each time the first message is sent in the 2-step random access procedure.

Optionally, the sending power of the first message of the 2-step random access procedure includes a sending power of the preamble and/or a sending power of a data channel.

It should be understood that the terminal device 500 may perform corresponding operations performed by the terminal device in the above method 400, and this will not be repeated herein for the sake of brevity.

The implementation of the present disclosure further provides a network device, which includes a transceiving unit. The transceiving unit is configured to send indication information, wherein the indication information is used for indicating a first threshold, and the first threshold is used for the terminal device to determine whether to switch from a 2-step random access procedure to a 4-step random access procedure.

Optionally, the indication information is carried in a RRC signaling or a broadcast message.

It should be understood that the network device may perform the corresponding operations performed by a network device in the method of the implementations of the present disclosure, which will not be repeated here for the sake of brevity.

Figure 6:
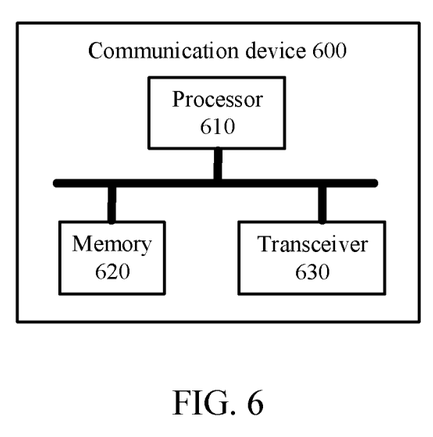
FIG. 6 is a schematic diagram of a structure of communication device according to an implementation of the present disclosure.

FIG. 6 is a schematic diagram of a structure of a communication device 600 according to an implementation of the present disclosure. The communication device 600 shown in FIG. 6 includes a processor 610. The processor 610 may call and run a computer program from a memory to implement the methods in the implementations of the present disclosure.

Optionally, as shown in FIG. 6, the terminal device 600 may further include a memory 620. The processor 610 may call and run a computer program from the memory 620 to implement the method in an implementation of the present disclosure.

The memory 620 may be a separate device independent of the processor 610 or may be integrated in the processor 610.

Optionally, as shown in FIG. 6, the terminal device 600 may further include a transceiver 630, and the processor 610 may control the transceiver 630 to communicate with another device. Specifically, the transceiver 630 may send information or data to another device or receive information or data sent by another device.

The transceiver 630 may include a transmitter and a receiver. The transceiver 630 may further include antennas, and the number of antennas may be one or more.

Optionally, the communication device 600 may be specifically the network device according to the implementation of the present disclosure, and the communication device 600 may implement the corresponding processes implemented by the network device in various methods in the implementations of the present disclosure, which will not be repeated herein for the sake of brevity.

Optionally, the communication device 600 may be specifically the terminal device according to the implementation of the present disclosure, and the communication device 600 may implement the corresponding processes implemented by the terminal device in various methods in the implementations of the present disclosure, which will not be repeated herein for the sake of brevity.

Figure 7:
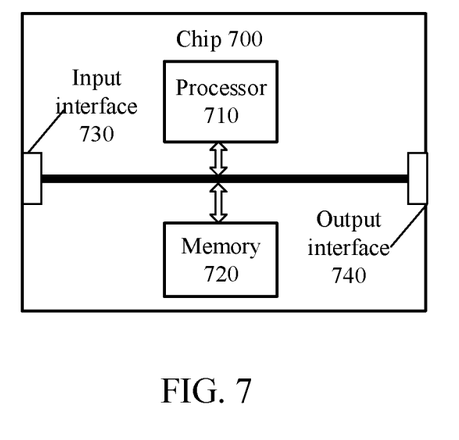
FIG. 7 is a schematic diagram of a structure of chip according to an implementation of the present disclosure.

FIG. 7 is a schematic diagram of structure of a chip according to an implementation of the present disclosure. A chip 700 shown in FIG. 7 includes a processor 710. The processor 710 may call and run a computer program from a memory to implement the method in an implementation of the present disclosure.

Optionally, as shown in FIG. 7, the chip 700 may further include a memory 720. The processor 710 may call and run a computer program from the memory 720 to implement the method in an implementation of the present disclosure.

The memory 720 may be a separate device independent of the processor 710 or may be integrated in the processor 710.

Optionally, the chip 700 may further include an input interface 730. The processor 710 may control the input interface 730 to communicate with another device or chip. Specifically, the processor may obtain information or data sent by another device or chip.

Optionally, the chip 700 may further include an output interface 740. The processor 710 may control the output interface 740 to communicate with another device or chip. Specifically, the processor 710 may output information or data to another device or chip.

Optionally, the chip may be applied to the network device in the implementation of the present disclosure, and the chip may implement the corresponding processes implemented by the network device in various methods of the implementations of the present disclosure, which will not be repeated herein for the sake of brevity.

Optionally, the chip may be applied to the terminal device in the implementation of the present disclosure, and the chip may implement the corresponding processes implemented by the terminal device in various methods in the implementations of the present disclosure, which will not be repeated herein for the sake of brevity.

It should be understood that the chip mentioned in an implementation of the present disclosure may be referred to as a system-level chip, a system chip, a chip system or a system-on-chip, etc.

It should be understood that, the processor in an implementation of the present disclosure may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, steps and logical block diagrams disclosed in an implementation of the present disclosure. The general purpose processor may be a microprocessor, or the processor may also be any conventional processor or the like. The acts of the method disclosed with reference to an implementation of the present disclosure may be directly implemented by a hardware decoding processor, or may be implemented by a combination of hardware and software modules in the decoding processor. The software modules may be located in a memory medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in an implementation of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM).

It should be understood that, the above memory is an example for illustration but should not be construed as a limitation. For example, the memory in an implementation of the present disclosure may also be a static RAM (SRAM), a dynamic RAM (DRAM), a Synchronous DRAM (SDRAM), a double data rate SDRAM (DDR SDRAM), an enhanced SDRAM (ESDRAM), a synch link DRAM (SL- DRAM), a Direct Rambus RAM (DR RAM), or the like. That is, memories in implementations of the present disclosure are intended to include, but are not limited to, these and any other suitable types of memories.

Figure 8:
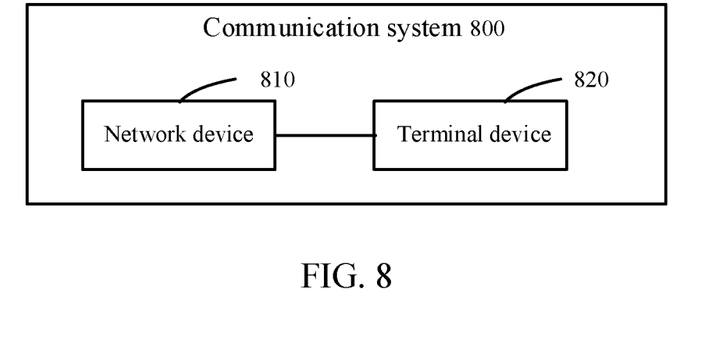
FIG. 8 is a schematic block diagram of a communication system according to an implementation of the present disclosure.

FIG. 8 is a schematic block diagram of a communication system 800 according to an implementation of the present disclosure. As shown in FIG. 8, the communication system 800 may include a network device 810 and a terminal device 820.

The network device 810 is configured to send indication information, wherein the indication information is used for indicating a first threshold, and the first threshold is used by the terminal device to determine whether to switch from a 2-step random access procedure to a 4-step random access procedure.

The terminal device 810 is configured to send a first message of the 2-step random access procedure in the 2-step random access procedure; and switch to the 4-step random access procedure if sending times of the first message of the 2-step random access procedure reaches the first threshold, and the second message of the 2-step random access procedure is still not received.

The terminal device 810 may be configured to implement the corresponding functions implemented by the network device in a method of an implementation of the present disclosure, which will not be repeated herein for the sake of brevity.

The terminal device 820 may be configured to implement corresponding functions implemented by the terminal device in a method of an implementation of the present disclosure, and composition of the terminal device 820 may be as shown in the terminal device 500 in FIG. 5, which will not be repeated here for the sake of brevity.

An implementation of the present disclosure further provides a computer readable storage medium configured to store a computer program. Optionally, the computer readable storage medium may be applied to the network device in the implementation of the present disclosure, and the computer program enables a computer to perform the corresponding processes implemented by the network device in various methods of the implementations of the present disclosure, which will not be repeated herein for the sake of brevity. Optionally, the computer readable storage medium may be applied to the terminal device in the implementation of the present disclosure, and the computer program enables the computer to perform the corresponding processes implemented by the terminal device in various methods of the implementations of the present disclosure, which will not be repeated herein for the sake of brevity.

An implementation of the present disclosure further provides a computer program product, including computer program instructions. Optionally, the computer program product may be applied to a network device of the implementation of the present disclosure, and the computer program instructions enable a computer to perform corresponding processes implemented by the network device in various methods of the implementations of the present disclosure, which will not be repeated here for the sake of brevity. Optionally, the computer program product may be applied to the terminal device in the implementation of the present disclosure, and the computer program instructions enable the computer to perform the corresponding processes implemented by the terminal device in various methods in the implementations of the present disclosure, which will not be repeated herein for the sake of brevity.

An implementation of the present disclosure further provides a computer program.

Optionally, the computer program may be applied to the network device in the implementation of the present disclosure. The computer program, when running on a computer, enables the computer to perform the corresponding processes implemented by the network device in various methods of the implementations of the present disclosure, which will not be repeated herein for the sake of brevity. Optionally, the computer program may be applied to the terminal device in the implementation of the present disclosure. The computer program, when running on a computer, enables the computer to perform the corresponding processes implemented by the terminal device in various methods of the implementations of the present disclosure, which will not be repeated herein for the sake of brevity.

It should be understood that the terms "system" and "network" are often used interchangeably in this specification. The term "and/or" in this specification is merely an association relation describing associated objects, indicating that there may be three relations, for example, A and/or B may indicate three cases: A alone, A and B, and B alone. In addition, the symbol "I" in this specification generally indicates that objects before and after the symbol "I" have an "or" relation.

It should further be understood that in an implementation of the present invention, "B corresponding to A" represents that B is associated with A, and B may be determined according to A. However, it should be further understood that determining B according to A does not mean that B is determined according to A only, but B may also be determined according to A and/or other information.

Those of ordinary skill in the art will recognize that the exemplary elements and algorithm acts described in combination with implementations disclosed herein may be implemented in electronic hardware, or a combination of computer software and electronic hardware. Whether these functions are implemented in hardware or software depends on the specific application and design constraints of the technical solution. Those skilled in the art may use different methods to implement the described functions in respect to each particular application, but such implementation should not be considered to be beyond the scope of the present disclosure.

Those skilled in the art may clearly learn that for convenience and conciseness of description, the specific working processes of systems, apparatuses and units described above may refer to the corresponding processes in the method implementations, and this will not be repeated here.

In several implementations provided by the present disclosure, it should be understood that the disclosed systems, apparatuses and methods may be implemented in other ways. For example, the apparatus implementation described above is only illustrative, for example, the division of the units is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection of apparatuses or units through some interfaces, and may be in electrical, mechanical or other forms.

A unit described as a separate component may or may not be physically separated, and a component shown as a unit may or may not be a physical unit, i.e., it may be located in one place or may be distributed over multiple network units.

Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a memory medium, including a number of instructions for causing a computer device (which may be a personal computer, a server, or a network device and the like) to perform all or part of the acts of the method described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

What is claimed is:

1. A random access method, comprising:
    sending, by a terminal device, a first message of a 2-step random access procedure in the 2-step random access procedure; and
    switching, by the terminal device, to a 4-step random access procedure, if sending times of the first message of the 2-step random access procedure reach a first threshold and a second message of the 2-step random access procedure is still not received;
    wherein after switching, by the terminal device, to the 4-step random access procedure, the method further comprises:
    determining, by the terminal device, a first power; and
    using, by the terminal device, the first power to send a first message in the 4-step random access procedure;
    wherein determining, by the terminal device, the first power comprises:
        determining, by the terminal device, the first power according to a sending power of the first message of the 2-step random access procedure.

2. The method of claim 1, wherein the first message of the 2-step random access procedure comprises a preamble and/or a data channel.

3. The method of claim 1, wherein the second message of the 2-step random access procedure comprises a random access response (RAR) message and/or a contention resolution message.

4. The method of claim 1, further comprising:
    receiving, by the terminal device, indication information, wherein the indication information is used for indicating the first threshold.

5. The method of claim 1, wherein determining, by the terminal device, the first power according to the sending power of the first message of the 2-step random access procedure comprises:
    determining, by the terminal device, the first power according to a sending power of a last transmission of the first message in the 2-step random access procedure.

6. The method of claim 1, wherein determining, by the terminal device, the first power according to the sending power of the last transmission of the first message in the 2-step random access procedure comprises:
    obtaining, by the terminal device, the first power by increasing the sending power of the last transmission of the first message in the 2-step random access procedure by $\Delta P$;
    wherein the $\Delta P$=preambleReceivedTargetPower_2stepRACH−preambleReceivedTargetPower_4stepRACH, the preambleReceivedTargetPower_2stepRACH is a target expected received power of a preamble in the first message in the 2-step random access procedure; the preambleReceivedTargetPower_4stepRACH is a target expected received power of a preamble in the first message in the 4-step random access procedure.

7. A random access method, comprising:
    sending, by a network device, indication information, wherein the indication information is used for indicating a first threshold, and the first threshold is used for a terminal device to determine whether to switch from a 2-step random access procedure to a 4-step random access procedure,
    wherein after the terminal device determines to switch to the 4-step random access procedure, the method further comprises:
    determining, by the terminal device, a first power according to a sending power of the first message of the 2-step random access procedure; and
    using, by the terminal device, the first power to send a first message in the 4-step random access procedure.

8. The method of claim 7, wherein the indication information is carried in a radio resource control (RRC) signaling or a broadcast message.

9. The method of claim 7, wherein the first message of the 2-step random access procedure comprises a preamble and/or a data channel.

10. The method of claim 7, wherein the second message of the 2-step random access procedure comprises a random access response (RAR) message and/or a contention resolution message.

11. A terminal device, comprising: a processor, a memory, and a transceiver, wherein the memory is configured to store a computer program, the transceiver is configured to communicate with another device under control of the processor, the processor is configured to execute the program in the memory to:
    send, through the transceiver, a first message of a 2-step random access procedure in the 2-step random access procedure; and
    switch to a 4-step random access procedure when sending times of the first message of the 2-step random access procedure reach a first threshold and a second message of the 2-step random access procedure is still not received,
    wherein after the terminal device switches to the 4-step random access procedure, the terminal is configured to:

determine a first power according to a sending power of the first message of the 2-step random access procedure; and control the transceiver to use the first power to send a first message of the 4-step random access procedure.

12. The terminal device of claim 11, wherein the first message of the 2-step random access procedure comprises a preamble and/or a data channel.

13. The terminal device of claim 11, wherein the second message of the 2-step random access procedure comprises a random access response (RAR) message and/or a contention resolution message.

14. The terminal device of claim 11, wherein the processor is configured to:

control the transceiver to receive indication information, wherein the indication information is used for indicating the first threshold.

15. The terminal device of claim 11, wherein the processor is configured to:

determine the first power according to a sending power of a last transmission of the first message in the 2-step random access procedure.

16. The terminal device of claim 15, wherein the processor is configured to:

obtaining the first power by increasing the sending power of the last transmission of the first message in the 2-step random access procedure by ΔP;

wherein the ΔP=preambleReceivedTargetPower_2stepRACH−preambleReceivedTargetPower_4stepRACH, the preambleReceivedTargetPower_2stepRACH is a target expected received power of a preamble in the first message in the 2-step random access procedure; the preambleReceivedTargetPower_4stepRACH is a target expected received power of a preamble in the first message in the 4-step random access procedure.

17. A network device, wherein the network device comprises:

a processor, a memory, and a transceiver, wherein the memory is configured to store a computer program, the transceiver is configured to communicate with another device under control of the processor, the processor is configured to execute the program in the memory to:

send, through the transceiver, indication information, wherein the indication information is used for indicating a first threshold, and the first threshold is used for a terminal device to determine whether to switch from a 2-step random access procedure to a 4-step random access procedure, wherein after the terminal device switches to the 4-step random access procedure, the terminal is configured to:

determine a first power according to a sending power of the first message of the 2-step random access procedure; and control the transceiver to use the first power to send a first message of the 4-step random access procedure.

18. The network device of claim 17, wherein the indication information is carried in a radio resource control (RRC) signaling or a broadcast message.

19. The network device of claim 17, wherein the first message of the 2-step random access procedure comprises a preamble and/or a data channel.

20. The network device of claim 17, wherein the second message of the 2-step random access procedure comprises a random access response (RAR) message and/or a contention resolution message.

* * * * *